(12) United States Patent
Zhou (10) Patent No.: US 9,033,047 B2
(45) Date of Patent: May 19, 2015

(54) ENHANCED OIL RECOVERY IN LOW PERMEABILITY RESERVOIRS

(75) Inventor: Dengen Zhou, Sugarland, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 224 days.

(21) Appl. No.: 12/953,824

(22) Filed: Nov. 24, 2010

(65) Prior Publication Data

US 2012/0125644 A1     May 24, 2012

(51) Int. Cl.
*E21B 43/00* (2006.01)
*E21B 43/16* (2006.01)
*C09K 8/594* (2006.01)

(52) U.S. Cl.
CPC .............. *E21B 43/164* (2013.01); *C09K 8/594* (2013.01); *E21B 43/166* (2013.01)

(58) Field of Classification Search
None
See application file for complete search history.

(56) References Cited

U.S. PATENT DOCUMENTS

| | | | | |
|---|---|---|---|---|
| 3,342,256 A * | 9/1967 | Bernard et al. | ............... | 166/403 |
| 4,478,612 A * | 10/1984 | Diaz et al. | ........................ | 95/231 |
| 4,519,455 A * | 5/1985 | Holtmyer et al. | .......... | 166/305.1 |
| 4,554,082 A * | 11/1985 | Holtmyer et al. | .............. | 507/240 |
| 4,576,232 A | 3/1986 | Duerksen et al. | | |
| 4,706,752 A * | 11/1987 | Holm | ............................ | 166/403 |
| 4,763,730 A * | 8/1988 | Suzuki | ........................... | 166/403 |
| 4,856,587 A * | 8/1989 | Nielson | .......................... | 166/401 |
| 4,887,671 A * | 12/1989 | Stevens, Jr. | ................ | 166/308.2 |
| 4,964,467 A * | 10/1990 | Holtmyer et al. | .......... | 166/308.5 |
| 5,033,547 A * | 7/1991 | Schievelbein | ................ | 166/403 |
| 5,038,864 A | 8/1991 | Dunleavy et al. | | |
| 5,129,457 A | 7/1992 | Sydansk | | |
| 5,234,054 A * | 8/1993 | Chou | ............................ | 166/270 |
| 6,227,296 B1 * | 5/2001 | Reppert et al. | ............. | 166/305.1 |
| 6,945,327 B2 * | 9/2005 | Ely et al. | ........................ | 166/263 |
| 7,261,158 B2 * | 8/2007 | Middaugh et al. | .......... | 166/280.2 |
| 7,451,820 B2 * | 11/2008 | Albers et al. | ................ | 166/308.6 |
| 7,726,404 B2 * | 6/2010 | Kubala et al. | ............... | 166/308.2 |
| 7,730,958 B2 | 6/2010 | Smith | | |
| 7,772,163 B1 * | 8/2010 | Brannon et al. | ............... | 507/219 |

(Continued)

FOREIGN PATENT DOCUMENTS

WO    WO 2009067418    *    5/2009

OTHER PUBLICATIONS

Le et al., A Novel Foam Concept with $CO_2$ Dissolved Surfactants, SPE 113370, Tulsa, Oklahoma, U.S.A., Apr. 19-23, 2008.
Xing et al., $CO_2$-Soluble Surfactants for Improved Mobility Control, SPE 129907, Tulsa, Oklahoma, U.S.A., Apr. 24-28, 2010.
PCT International Search Report regarding PCT/US2011/059363 dated Mar. 22, 2012 (3 pgs).

(Continued)

*Primary Examiner* — Angela M DiTrani
*Assistant Examiner* — Anuradha Ahuja
(74) *Attorney, Agent, or Firm* — Craig Vander Ploeg; Tiffany E. Weksberg (57) ABSTRACT

A method for enhancing hydrocarbon recovery in low permeability reservoirs comprises first providing a subterranean reservoir comprising one or more hydrocarbons and water therewithin and a wellbore in fluid communication with the subterranean reservoir. Next, a substantially anhydrous composition is injected into the reservoir through the wellbore. The substantially anhydrous composition comprises carbon dioxide and one or more surfactants. The composition is suitable to form a foam upon contact with the water within the reservoir. The method often results in reduced wellbore corrosion and hydrate formation, reduced reservoir fingering, and enhanced carbon dioxide sweep efficiency over conventional methods.

15 Claims, 4 Drawing Sheets

(56) References Cited

U.S. PATENT DOCUMENTS

| | | |
|---|---|---|
| 2004/0157749 A1* | 8/2004 | Ely et al. .................. 507/200 |
| 2005/0045335 A1* | 3/2005 | O'Brien et al. ............ 166/308.5 |
| 2006/0243437 A1* | 11/2006 | Albers et al. ............. 166/250.01 |
| 2009/0260828 A1* | 10/2009 | Kubala et al. .............. 166/308.3 |
| 2011/0108269 A1* | 5/2011 | Van Den Berg et al. ...... 166/266 |

OTHER PUBLICATIONS

Bennett, H., F.A.I.C.; "Concise Chemical and Technical Dictionary"; Fourth Enlarged Edition, 1986, Chemical Publishing Co., Inc., New York, NY, pp. 487 and 1210.

\* cited by examiner

FIG. 4

ENHANCED OIL RECOVERY IN LOW PERMEABILITY RESERVOIRS

TECHNICAL FIELD

The instant invention pertains to a method for enhancing hydrocarbon recovery in low permeability reservoirs.

BACKGROUND AND SUMMARY

Economical hydrocarbon recovery from reservoirs may sometimes prove difficult due to, for example, low recovery efficiencies. To improve efficiencies, enhanced oil recovery processes are typically utilized to increase the amount of hydrocarbon production from a subterranean reservoir. For example, carbon dioxide is sometimes injected into a subterranean reservoir in an attempt to displace the hydrocarbons. Hydrocarbon displacement is primarily achieved through mechanisms including oil swelling and viscosity reduction. In particular, carbon dioxide is miscible with the lighter components of the hydrocarbons such that as they mix, the composition or phase behavior of the hydrocarbons is altered, thus improving the recovery of the hydrocarbons.

Figure 1:
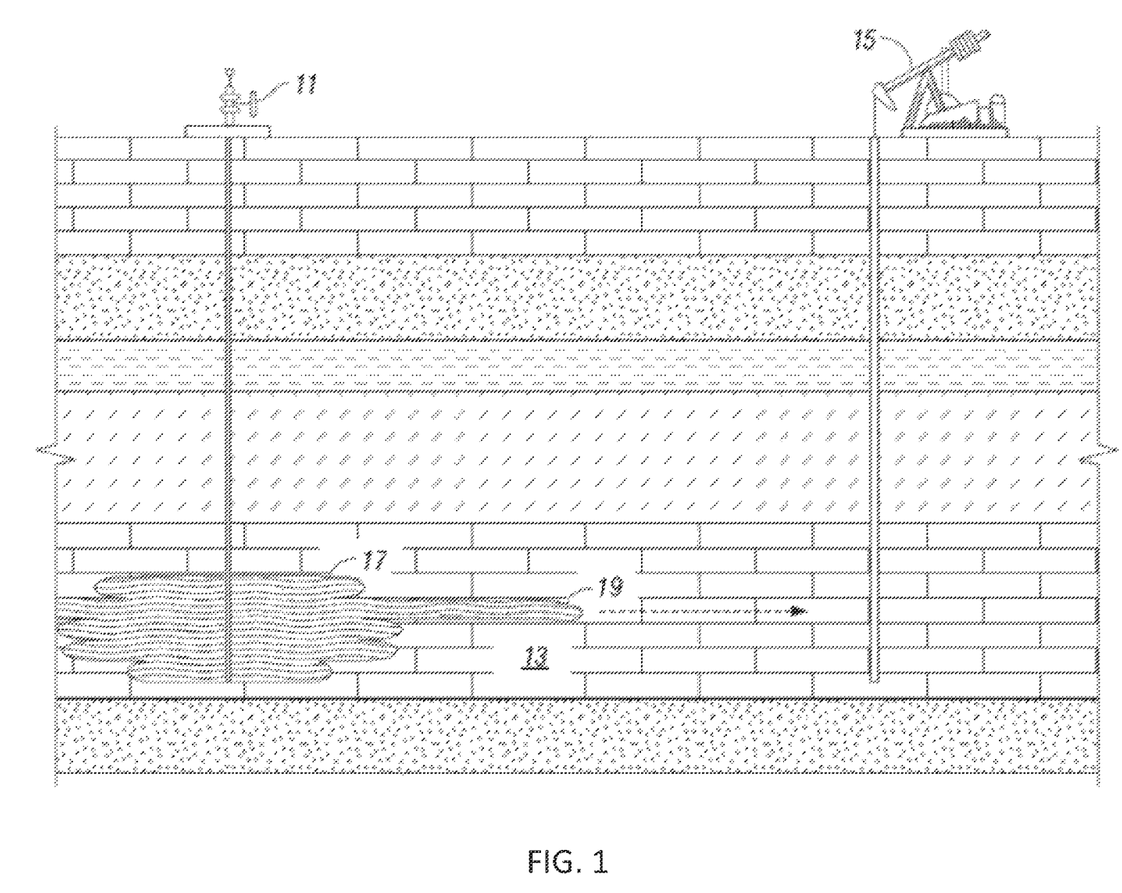
FIG. 1 is a schematic sectional view of a reservoir that is in fluid communication with an injection welt and a production well during prior art enhanced oft recovery operations.

FIG. 1 illustrates prior art carbon dioxide flooding of subterranean reservoir 13. Injection well 11 is illustrated extending to a portion of subterranean reservoir 13 that contains hydrocarbons for production. Injection well 11 is in fluid communication with subterranean reservoir 13 and the hydrocarbons therewithin. Production well 15 is positioned a predetermined distance away from injection well 11 and is also in fluid communication with subterranean reservoir 13 in order to receive the hydrocarbons therefrom. As will be readily appreciated by those skilled in the art, there can be additional production wells 15 spaced apart from injection well 11 at predetermined locations to optimally receive the hydrocarbons being pushed through subterranean reservoir due to injections from injection well 11. Injection of carbon dioxide 17 may result in a phenomenon called fingering or channeling in which injected carbon dioxide 17 preferentially follows certain narrow paths 19 through the reservoir formation. This fingering or channeling is often more pronounced in low permeability reservoirs. And unfortunately, this non-uniform spreading results in carbon dioxide 17 bypassing substantial amounts of hydrocarbons in subterranean reservoir 13 such that the bypassed hydrocarbons are not mobilized for recovery.

In an attempt to reduce fingering, water may be injected with the carbon dioxide via the injection wellbore. As described in SPE 113370, the recovery of hydrocarbons may involve different recovery methods. In a WAG process, aqueous brine solutions are injected which are then followed by $CO_2$ injection. Similarly, in a SAG process, aqueous surfactant solutions are injected which are then followed by $CO_2$ injection. And in a modified WAG process, aqueous brine solutions are injected which are then followed by $CO_2$ with dissolved surfactant injection.

While such WAG and SAG processes may improve recovery efficiency in some cases, they may not be able to be used on some reservoirs due to adverse conditions like, for example, extreme temperatures or very low permeability. And even in the cases where such processes can be used, they often lead to other problems. For example, the water and carbon dioxide mixture can form hydrates in the wellbore, which can be problematic by inhibiting or interrupting flow—particularly at high velocities. In addition, at wellbore conditions the $CO_2$ and water are acidic and therefore, may be corrosive to the wellbore and other metals with which they come in contact within the system.

Accordingly, what is needed is an alternative process for economical hydrocarbon recovery especially deepwater applications. It would be beneficial if such a process was useful for low permeability reservoirs. It would further be beneficial if such a process resulted in reduced wellbore corrosion and hydrate formation, reduced reservoir fingering, and enhanced carbon dioxide sweep efficiency compared to conventional methods.

Fortunately, the present inventors have discovered new processes and compositions which may meet one or more of the aforementioned needs or even have other advantages. In one embodiment, the invention relates to a method for enhancing hydrocarbon recovery in low permeability reservoirs. The method comprises first providing a subterranean reservoir comprising one or more hydrocarbons and water therewithin and a wellbore in fluid communication with the subterranean reservoir. Next, carbon dioxide is injected into the reservoir through the wellbore under conditions sufficient to substantially reduce or eliminate water in and near the wellbore. Then a substantially anhydrous composition is injected into the reservoir through the wellbore. The substantially anhydrous composition comprises carbon dioxide and one or more surfactants. The composition is suitable to form a foam upon contact with water within the subterranean reservoir. Advantageously, the method often results in reduced wellbore corrosion, hydrate formation, reduced reservoir fingering, and enhanced carbon dioxide sweep efficiency over conventional methods.

In another embodiment, the invention relates to a method for enhancing hydrocarbon recovery in low permeability reservoirs. The method comprises first providing a subterranean reservoir comprising one or more hydrocarbons and water therewithin, wellbore in fluid communication with the subterranean reservoir, and dehydrated carbon dioxide. Next, the dehydrated carbon dioxide is injected into the reservoir through the wellbore to substantially reduce or eliminate water in and near the wellbore. One or more surfactants are added to the dehydrated carbon dioxide after a predetermined amount of dehydrated carbon dioxide has been injected. For example, the surfactants can be added after approximately 1% to 2% hydrocarbon pore volumes of dehydrated carbon dioxide have been injected. Adding the one or more surfactants to the dehydrated carbon dioxide forms a substantially anhydrous composition that is suitable to form a foam upon contact with water within the subterranean reservoir.

DETAILED DESCRIPTION

General Process

The instant invention relates in one embodiment to a method for enhancing hydrocarbon, e.g., oil, recovery in tow permeability reservoirs. The method typically comprises (a) providing a subterranean reservoir comprising one or more hydrocarbons and water therewithin and (b) providing a wellbore in fluid communication with the subterranean reservoir. Next, a carbon dioxide composition is injected into the reservoir under conditions sufficient to substantially reduce or eliminate water in or near the wellbore. Then a substantially anhydrous composition is injected into the reservoir through the wellbore. The substantially anhydrous composition comprises carbon dioxide and one or more surfactants wherein the composition is suitable to form a foam upon contact with water within the reservoir. In one embodiment, the instant process is undertaken on a reservoir in the substantial or complete absence of waterflooding. That is, water is not desired near the wellbore and therefore, waterflooding is to be avoided for a predetermined time leading up to the use of the instant process, which can be determined based on the reservoir heterogeneity and water saturation. Moreover, the instant process is most useful on low permeability reservoirs where waterflooding may prove inefficient.

The instant process is broadly applicable to many subterranean reservoirs in need of enhanced recovery efficiency without the attendant problems often associated with SAG or WAG processes. In one embodiment, the instant invention has been found particularly suited to reservoirs of low permeability. Such low permeability reservoirs may be located onshore or offshore. The permeability may vary widely but is sometimes less than about 10 millidarcy (md) and sometimes even less than about 5 md. For onshore reservoirs the method may be particularly useful for reservoirs with a permeability of less than about 5 md while for offshore reservoirs the method may be particularly useful for reservoirs with a permeability of less than about 10 md. In another embodiment, it has been found that reservoirs upon which the processes may be employed often have less than about 0.5%, or less than about 0.3%, pore volume annual injectivity.

Further, the inventive processes may find particular utility in very low temperatures where water cannot be employed in, as for example, a WAG or SAG process because it could potentially freeze and inhibit flow in the wellbore or further downhole. The inventive processes may also be particularly useful in those reservoirs where injection of water may be too slow to be economic and/or wherein injecting CO2 may be useful to take advantage of higher mobility. These challenging conditions may be found offshore.

The measured depth of the subterranean reservoir is not particularly critical so long as the reservoir comprises one or more hydrocarbons and water therein and the anhydrous composition is selected to appropriately function at the reservoir's conditions, e.g., temperature and pressure. In addition, a wellbore is usually positioned such that it is in fluid communication with the subterranean reservoir. Such fluid communication may be accomplished in any convenient manner, e.g., pipe, tube, cylinder, conduit, duct, so long as injected fluid is able to contact the hydrocarbons and water in the reservoir in an appropriate manner. Advantageously, the instant methods may often be applicable even when the subterranean reservoir has a measured depth of at least about 10,000 feet or more. In some embodiments, the subterranean reservoir has a measured depth of at least about 20,000 feet or more. At such depths, the bottom-hole injection pressure can be greater than about 15,000 psig, or greater than about 25,000 psig.

In one or more embodiments, the carbon dioxide is injected into the reservoir through the wellbore to substantially reduce or eliminate water in and near the wellbore. One or more surfactants are then added to the carbon dioxide after a predetermined amount of carbon dioxide has been injected. For example, the surfactants can be added after approximately 1% to 2% hydrocarbon pore volumes of carbon dioxide have been injected. Adding the one or more surfactants to the carbon dioxide forms a substantially anhydrous composition that is suitable to form a foam upon contact with water within the subterranean reservoir.

Injection and Components of the Substantially Anhydrous Composition

The process comprises injecting carbon dioxide into the reservoir through a wellbore under conditions sufficient to substantially reduce or eliminate water in or near the wellbore, followed by injecting a substantially anhydrous composition into the reservoir through the wellbore. The initial carbon dioxide injection is typically substantially pure carbon dioxide, for example, at least about 95%, preferably at least about 98% carbon dioxide. The injection should be conducted under conditions such that any water in or near the wellbore is substantially reduced or eliminated. In this manner, water saturation is reduced and any foam from the subsequent injection of the substantially anhydrous composition is formed in the desired location in the reservoir instead of in or near the wellbore. Advantageously, this delay in the foam production often reduces injectivity losses and improves flow assurance.

The amount of carbon dioxide injected to substantially reduce or eliminate water varies depending upon many factors such as the amount of water present, reservoir heterogeneity, and the size of the wellbore. Generally, injection of from about 1% to about 2% pore volumes of carbon dioxide may be sufficient. Typically, the carbon dioxide is dehydrated prior to injection such that it contains less than 150 parts per million (ppm) of water. In one embodiment, the carbon dioxide is dehydrated such that it contains less than 50 parts per million (ppm) of water.

The substantially anhydrous composition comprises carbon dioxide and one or more surfactants wherein the composition is suitable to form a foam upon contact with water within the reservoir. The particular manner of injection is unimportant so long as the carbon dioxide and surfactant components of the composition do not permanently separate before contact with the reservoir. In this manner, the components and conditions may simply be selected such that the components do not significantly separate. That is, the one or more surfactants of the substantially anhydrous composition are sufficiently soluble in carbon dioxide such that the carbon dioxide and one or more surfactants form a mixture which does not significantly separate in the wellbore. Alternatively or additionally, a mechanical or physical mechanism, e.g., a mixer, may be employed to facilitate the process. Advantageously, the manner of injection is such that any foam is generated away from the high pressure injector mechanism.

The carbon dioxide and one or more surfactants are injected into the wellbore in any manner so long as they can form an appropriate foam in the reservoir. Accordingly, the carbon dioxide and one or more surfactants may be injected simultaneously or consecutively through the same port or different ports. In one embodiment, the carbon dioxide is injected into the reservoir continuously to substantially reduce or eliminate water in or near the wellbore. This may be done, for example, until from about 1% to about 10% of the hydrocarbon pore volume is injected. In another example, injection of from about 1% to about 2% pore volumes of carbon dioxide is used. The substantially anhydrous composition of one or more surfactants with $CO_2$ is then injected as needed. The commencement of the injection of the $CO_2$/ surfactant mixture will vary depending upon its composition and reservoir parameters. The injection of the substantially anhydrous composition may be continuous or intermittent. That is, in some instances it may be advantageous to interrupt the substantially anhydrous composition injection with, for example, injection of carbon dioxide without the surfactant.

In the above manner, one may monitor the reservoir and/or recovery and inject surfactants when it is determined that additional foam is needed to assist in, for example, more uniformly dispersing and/or more strongly dispersing the carbon dioxide in the reservoir. In the aforementioned manners, the carbon dioxide may more efficiently sweep hydrocarbons from the reservoir to the producer and/or prevent the carbon dioxide from simply continuing to pass through the same "fingers" or regions of the reservoir and only inefficiently sweep hydrocarbons if at all.

The ingredients of the substantially anhydrous composition may not be particularly critical, so long as, an appropriate foam is formed upon contact with the water within the reservoir. Typically, the carbon dioxide and one or more surfactants do not react and therefore in one embodiment, the substantially anhydrous composition is a simple mixture. In another embodiment, to the extent that there is a reaction between the carbon dioxide and one or more surfactants, then the anhydrous composition is a reaction product of at least those components. And as mentioned previously, it is often desirable if the one or more surfactants of the substantially anhydrous composition are sufficiently soluble in carbon dioxide such that the carbon dioxide and one or more surfactants form a mixture which does not significantly separate in the wellbore.

The relative amounts of carbon dioxide and one or more surfactants will often vary widely depending upon the particular surfactant and the desired characteristics of the appropriate foam. Foams may vary in their shear thickening properties which in turn affects the ultimate hydrocarbon recovery efficiency. In considering the desired foam for a given reservoir process, one skilled in the art may consider factors such as reservoir permeability, amount of reservoir water, and reservoir physical properties such as reservoir temperature and pressure. For example, if a given reservoir is fractured or has a high degree of fingering, then a higher shear thickening foam may be more desirable.

In general terms, the surfactant should generally be one which assists in reducing breakthrough time. As the skilled artisan appreciates the suractant(s) selection may vary depending upon such factors as salinity and clay content. Since water is to be avoided, suitable surfactants generally do not include or form significant amounts of water upon mixing with $CO_2$, it is also usually desirable to select a surfactant that does not substantially interfere with or hinder subsequent processing of the recovered hydrocarbons. Anionic surfactants, such as sulfonated surfactants, may prove useful in the methods of the invention. Such anionic surfactants are known and described in the art, for example, in SPE 129907, which is incorporated by reference herein to the extent it is not inconsistent.

Similarly, in general terms the total amount of surfactant(s) in the substantially anhydrous composition varies depending upon the desired results, and reservoir and hydrocarbon conditions. Generally, the total amount of surfactant in the substantially anhydrous composition comprising carbon dioxide and one or more surfactants is from about 0.01 to about 0.5 percent, or from about 0.01 to about 0.3 percent, by weight based on the total weight of the carbon dioxide.

The substantially anhydrous composition may have other ingredients that are beneficial or do not significantly degrade the properties in the instant process. Examples of such ingredients include solvents and adjuvants. The substantially anhydrous composition typically has little to no water. That is, the composition does not have so much water such that significant hydrate formation and/or corrosion occurs in the wellbore under usual operating conditions. This amount of water will vary depending upon many factors including, but not limited to, the ingredients and amounts of the substantially anhydrous composition, the conditions in the wellbore, as well as, the composition of the wellbore. In one embodiment, the substantially anhydrous composition contains less than 150 parts per million (ppm) of water. In one embodiment, the substantially anhydrous composition contains less than 50 ppm of water.

After injection of the substantially anhydrous composition, one or more hydrocarbons originally present in the reservoir may be recovered by any convenient means. Additionally or alternatively, in some cases it may be advantageous to alternate injecting carbon dioxide and the substantially anhydrous composition into the reservoir through the wellbore after recovering some hydrocarbons or before hydrocarbon recovery begins.

Although only exemplary embodiments are specifically illustrated and described herein, it will be appreciated that many modifications and variations of the process and apparatus described herein are possible in light of the above teachings and within the purview of the appended claims without departing from the spirit and intended scope of the claimed subject matter.

Example 1

Figure 2:
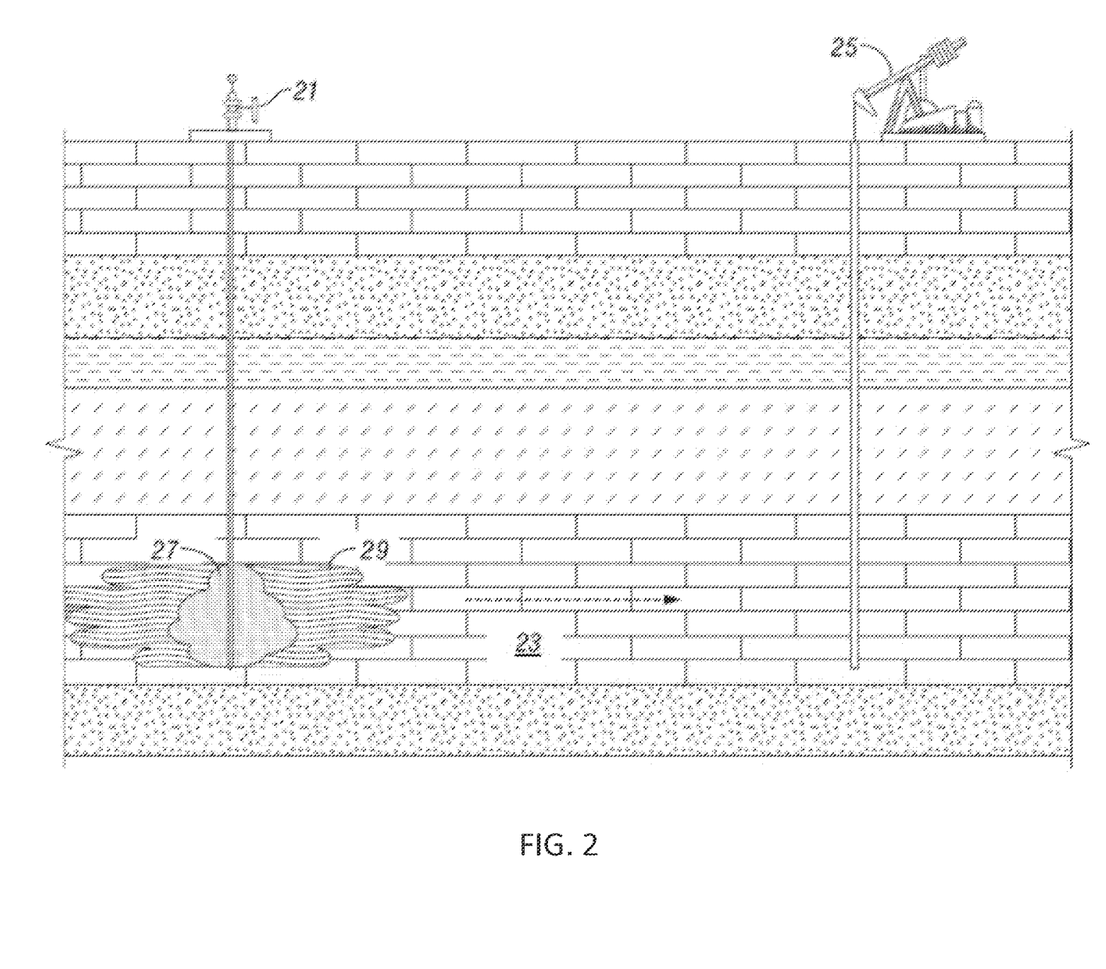
FIG. 2 is a schematic sectional view of a reservoir that is in fluid communication with an injection well and a production well during enhanced oil recovery operations after injection of a substantially anhydrous composition in accordance with the present invention.

Referring to FIG. 2, an injection well 21 is illustrated extending to a portion of a subterranean reservoir 23, which contains hydrocarbons for production. Injection well 21 is in fluid communication with subterranean reservoir 23 and the hydrocarbons therewithin. Production well 25 is positioned a predetermined distance away from injection well 21 and is also in fluid communication with reservoir 23 in order to receive the hydrocarbons therefrom. As will be readily appreciated by those skilled in the art, there can be additional production wells 25 spaced apart from injection well 21 at predetermined locations to optimally receive the hydrocarbons being pushed through reservoir 23 due to injections from injection well 21.

To determine a suitable substantially anhydrous composition for injection into a given reservoir, parameters of the reservoir are usually measured or considered. Such parameters include reservoir permeability, amount of reservoir water, and reservoir physical properties such as reservoir temperature and pressure. A core flood measurement with the core of the targeted reservoir may also be employed using a range of surfactants and amounts with carbon dioxide. In addition, a routine test to determine whether the surfactants and amounts selected may be done. Such a test may include, for example, a cloud point test of the substantially anhydrous composition at the reservoir's temperature and pressure.

In an embodiment of the invention, suitable anhydrous composition 27 is injected through injection well 21 into reservoir 23. Suitable anhydrous composition 27 preferably disperses through reservoir 23, with at least a portion thereof proceeding toward production well 25. Suitable anhydrous composition. 27 forms foam 29 in reservoir 23 upon contact with water in reservoir 23. Foam 29 reduces fingering and enhances sweep efficiency over conventional prior art WAG or SAG methods. As previously discussed, reduced wellbore corrosion and hydrate formation are also achieved as suitable anhydrous composition 27 is substantially free of water.

While not shown in FIG. 2, substantially pure carbon dioxide is continuously or intermittently injected through injection well 21 into reservoir 23 prior to the injection of suitable anhydrous composition 27. For example, about 1% to about 2% pore volumes of carbon dioxide can be injected. Injection of the carbon dioxide substantially reduces or eliminates water in reservoir 23 near injection well 21, thereby establishing injectivity. The carbon dioxide can also provide a buffer between the hydrocarbons and foam 29, which is produced by anhydrous composition 27 upon contact with water within subterranean reservoir 23. In particular, the buffer helps reduce degradation of foam 29 due to direct contact with the hydrocarbons.

Figure 3:
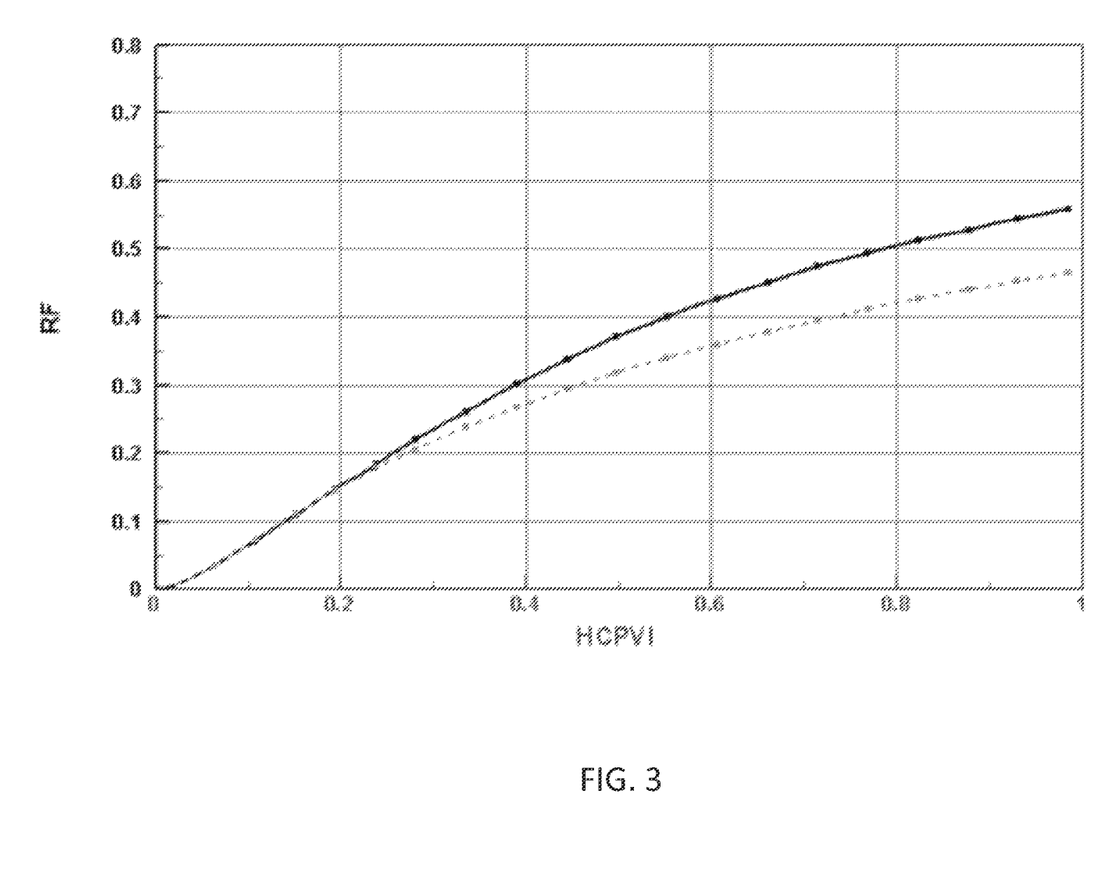
FIG. 3 is a graph showing the improvement of recovery efficiency expected in a deepwater formation using the invention.
Figure 4:
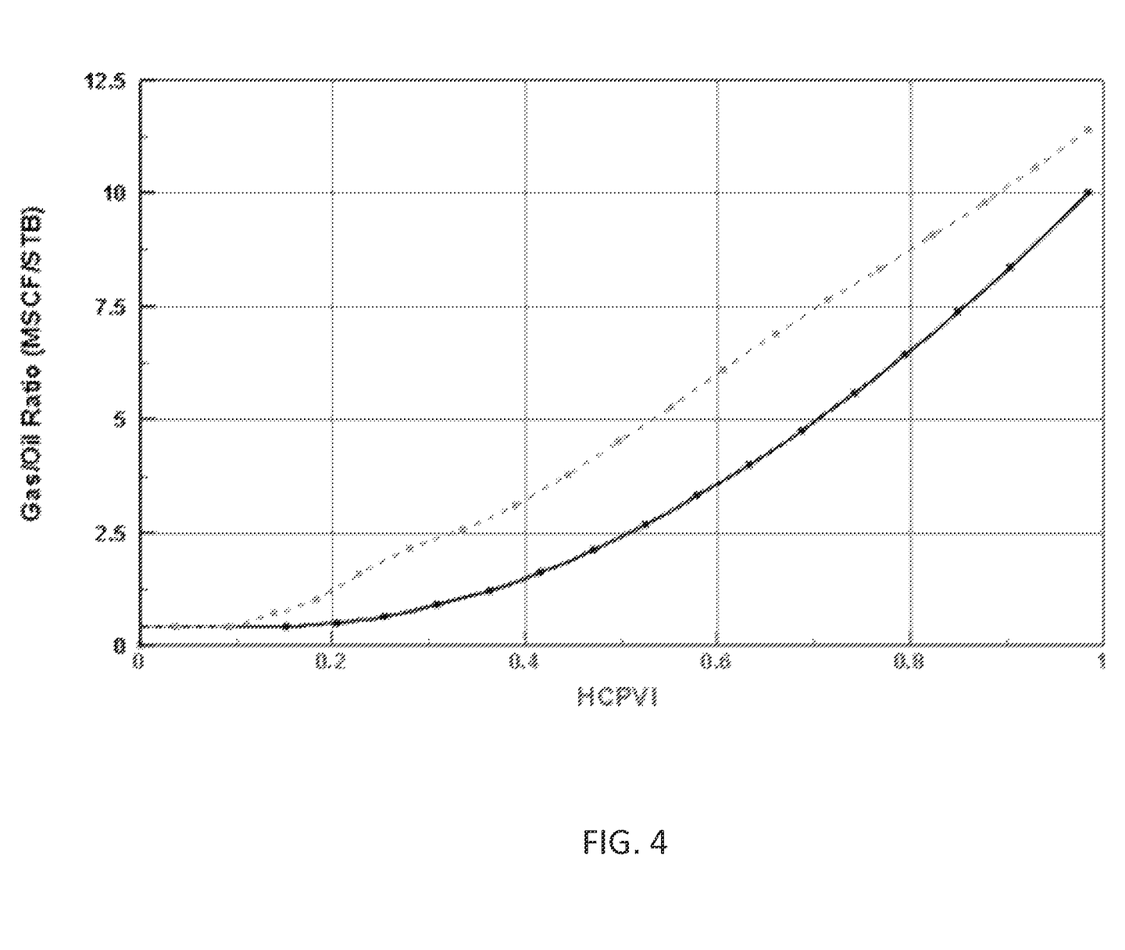
FIG. 4 is a graph showing the improvement of $CO_2$ utilization efficiency expected in a deepwater formation using the invention.

A sector model is used to demonstrate the impact of the aforementioned process. For purposes of the model, the reservoir hydrocarbons and carbon dioxide are assumed to be completely miscible at reservoir conditions. The models show that injection of the suitable anhydrous composition (1) improves recovery efficiency as shown in FIG. 3 and/or (2) reduces carbon dioxide recycling as shown in FIG. 4. For example, the model shows that injection of the suitable anhydrous composition, which is shown in solid line in FIG. 3, yields about 20% more oil recovery than using carbon dioxide alone, which is shown in dashed line, with respect to this reservoir.

FIG. 4 shows the produced gas-oil-ratio (GOR) as a function of total carbon dioxide injected. With carbon dioxide alone (dashed line), the carbon dioxide breaks through after about 0.1 hydrocarbon pore volumes (HCPV) of carbon dioxide injected. In contrast, the model shows that injection of a suitable anhydrous composition (solid line) according to the invention may result in carbon dioxide breaking through after about 0.2 HCPV of carbon dioxide injected. Further, GOR is a measure of carbon dioxide utilization efficiency. Thus, a higher GOR requires a greater need for carbon dioxide compression and processing which in turn leads to higher operation costs, as well as, larger facilities. FIGS. 3 and 4 show that the present invention may improve oil recovery, reduce operations costs, and reduce initial capital requirements. In sum, use of the inventive processes herein may sometimes improve the recovery of offshore reservoirs, or other reservoirs with challenging conditions, to a recovery factor which approaches conventional on-shore recovery factors. For example, an incremental oil recovery of about 10% of original-oil-in-place (OOIP) can be achieved.

What is claimed is:

1. A method for enhancing hydrocarbon recovery in reservoirs with a permeability of less than about 10 millidarcy, the method comprising:
   (a) providing a subterranean reservoir with a depth of at least about 10,000 feet, bottom-hole injection pressure of at least about 15,000 psig, and a permeability of less than about 10 millidarcy comprising one or more hydrocarbons and water therewithin;
   (b) providing a wellbore in fluid communication with the subterranean reservoir;
   (c) dehydrating a carbon dioxide composition comprising at least 95% carbon dioxide and more than 150 parts per million of water to form a dehydrated carbon dioxide composition comprising less than 150 parts per million of water;
   (d) injecting about 1% to about 2% hydrocarbon pore volumes of the dehydrated carbon dioxide composition into the subterranean reservoir through the wellbore under conditions such that any water in or near the wellbore is reduced or eliminated; and
   (e) after injecting the dehydrated carbon dioxide composition into the subterranean reservoir, injecting a substantially anhydrous composition with less than 150 parts per million of water into the subterranean reservoir through the wellbore, the substantially anhydrous composition comprising carbon dioxide and one or more surfactants and being suitable to form a foam upon contact with water within the subterranean reservoir.

2. The method of claim 1, wherein the subterranean reservoir is offshore.

3. The method of claim 1, wherein the subterranean reservoir has a permeability of less than about 5 millidarcy.

4. The method of claim 1, wherein the one or more surfactants of the substantially anhydrous composition are sufficiently soluble in the dehydrated carbon dioxide such that the dehydrated carbon dioxide and the one or more surfactants do not significantly separate in the wellbore.

5. The method of claim 1, wherein the method further comprises recovering hydrocarbons from the subterranean reservoir through a production well.

6. The method of claim 1, wherein the dehydrated carbon dioxide and the one or more surfactants are injected into the wellbore simultaneously.

7. The method of claim 1, wherein the dehydrated carbon dioxide and the one or more surfactants are injected into the wellbore consecutively.

8. The method of claim 1, wherein the dehydrated carbon dioxide is injected into the wellbore continuously and the one or more surfactants are injected intermittently.

9. The method of claim 1, wherein the total amount of the one or more surfactants in the substantially anhydrous composition is from about 0.01 to about 0.5 percent by weight based on the total weight of the substantially anhydrous composition.

10. The method of claim 1, wherein the total amount of the one or more surfactants in the substantially anhydrous composition is from about 0.01 to about 0.3 percent by weight based on the total weight of the substantially anhydrous composition.

11. The method of claim 1, wherein waterflooding is avoided for a predetermined time prior to (d).

12. The method of claim 1, wherein the subterranean reservoir has not been waterflooded prior to (d).

13. A method for enhancing hydrocarbon recovery in reservoirs with a permeability of less than about 10 millidarcy, the method comprising:
   (a) providing a subterranean reservoir with a depth of at least about 10,000 feet, bottom-hole injection pressure of at least about 15,000 psig, and a permeability of less than about 10 millidarcy comprising one or more hydrocarbons and water therewithin;
   (b) providing a wellbore in fluid communication with the subterranean reservoir;
   (c) providing dehydrated carbon dioxide with less than 150 parts per million of water;
   (d) injecting about 1% to about 2% hydrocarbon pore volumes of the dehydrated carbon dioxide into the subterranean reservoir through the wellbore; and
   (e) adding one or more surfactants to the dehydrated carbon dioxide after about 1% to about 2% hydrocarbon pore volumes of dehydrated carbon dioxide has been injected in step (d), wherein the dehydrated carbon dioxide reduces or eliminates water in or near the wellbore.

14. The method of claim 13, wherein adding the one or more surfactants to the dehydrated carbon dioxide in step (e) forms a substantially anhydrous composition that is suitable to form a foam upon contact with water within the subterranean reservoir.

15. The method of claim 13, wherein:
   adding the one or more surfactants to the dehydrated carbon dioxide in step (e) forms a substantially anhydrous composition; and
   the total amount of the one or more surfactants in the substantially anhydrous composition is from about 0.01 to about 0.5 percent by weight based on the total weight of the substantially anhydrous composition.

* * * * *